Jan. 8, 1957 D. M. PEARL 2,776,845
BICYCLE BALANCER
Filed Feb. 4, 1952 2 Sheets-Sheet 1

INVENTOR.
Daniel M. Pearl
BY
Louis Sheldon
Attorney

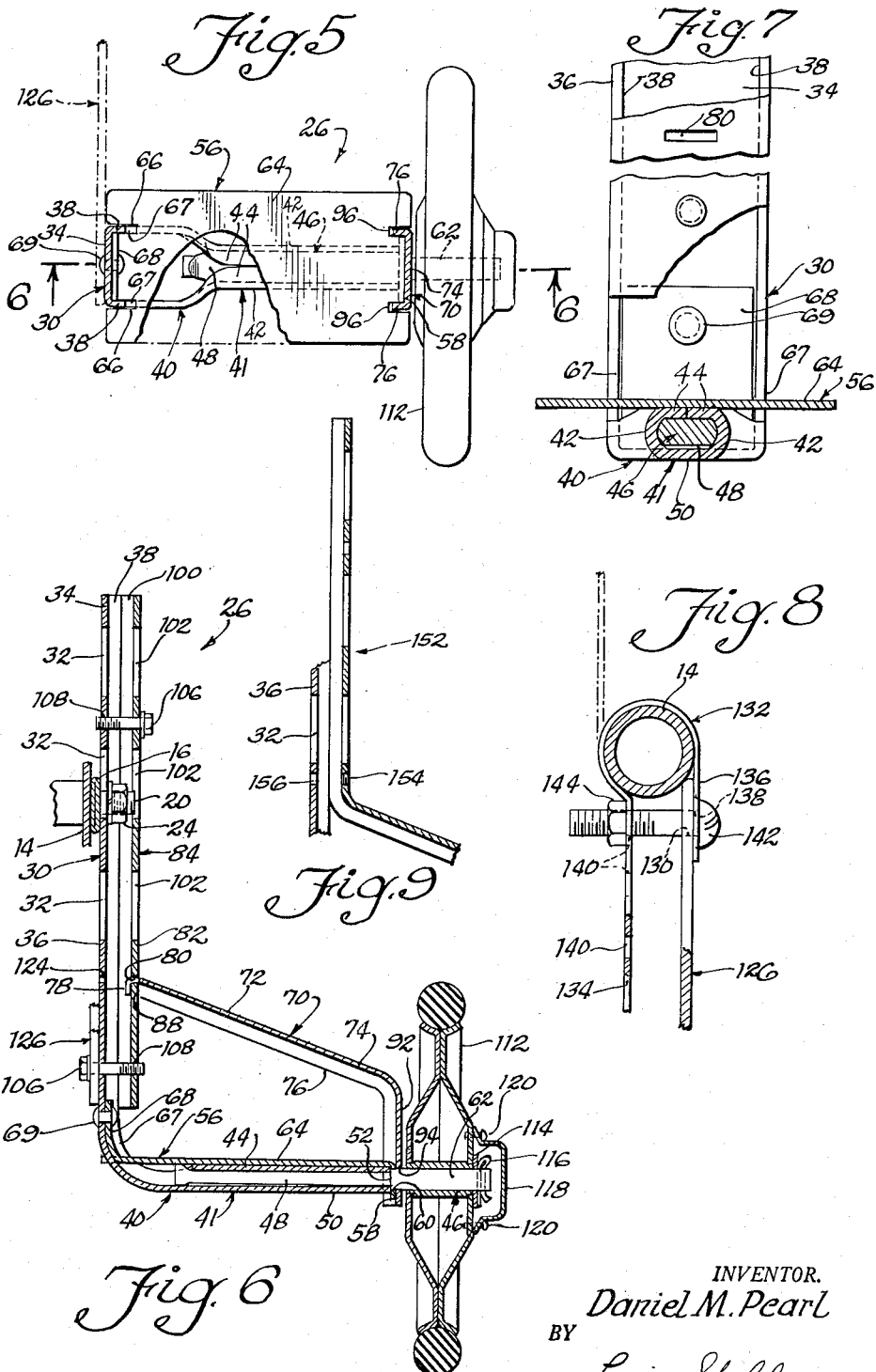

United States Patent Office 2,776,845
Patented Jan. 8, 1957

2,776,845

BICYCLE BALANCER

Daniel M. Pearl, Chicago, Ill., assignor to Darwin Products, Inc., Chicago, Ill., a corporation of Illinois Application February 4, 1952, Serial No. 269,818

10 Claims. (Cl. 280—304)

This invention relates to bicycle balancing devices and is concerned more particularly with a device adapted to be mounted in conjunction with the rear wheel of a bicycle for use by a child not quite adept or able to ride a bicycle, for the purpose of training the child to ride a bicycle.

An object of my invention is to provide a device of the character described involving relatively few parts which may be manufactured at low cost to produce a rigid and sturdy structure capable of easy assembly and attachment to a bicycle.

Another object is to provide a balancer of the character above mentioned adapted for use without facility for carrying an extra passenger, and capable with a very slight addition of being adapted for the carrying of an extra passenger.

A further object is to provide a device of the character referred to which may be readily mounted and adjusted on bicycles of different constructions and sizes.

Further objects and advantages of the invention will appear as the description proceeds.

The invention will be better understood upon reference to the following description and the accompanying drawings, in which:

Fig. 5 is a sectional view taken as indicated by the line 5—5 in Fig. 2.

Fig. 6 is a sectional view taken as indicated by the line 6—6 in Fig. 5.

Fig. 7 is an enlarged sectional view taken as indicated by the line 7—7 in Fig. 2.

Fig. 8 is an enlarged sectional view taken as indicated by the line 8—8 in Fig. 1.

Fig. 9 is a fragmentary sectional view of a modified construction.

Figure 1:
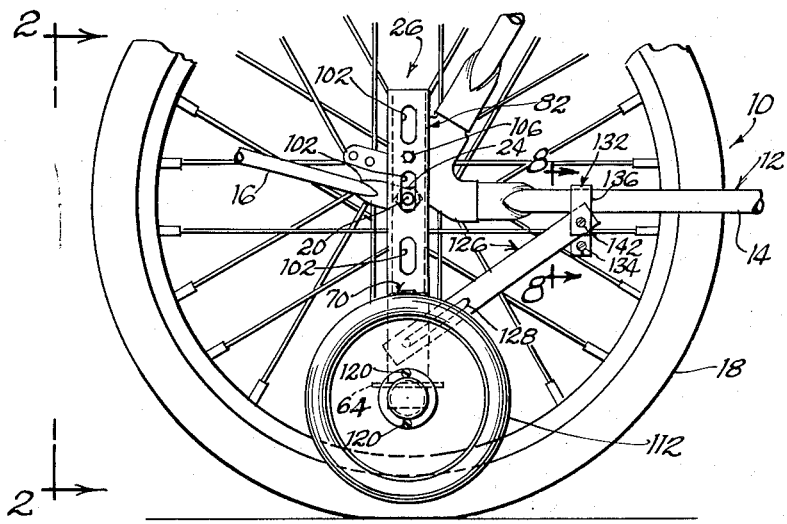
Fig. 1 is a fragmentary side elevational view of the rear part of a bicycle equipped with balancing mechanism constructed in accordance with the invention.
Figure 2:
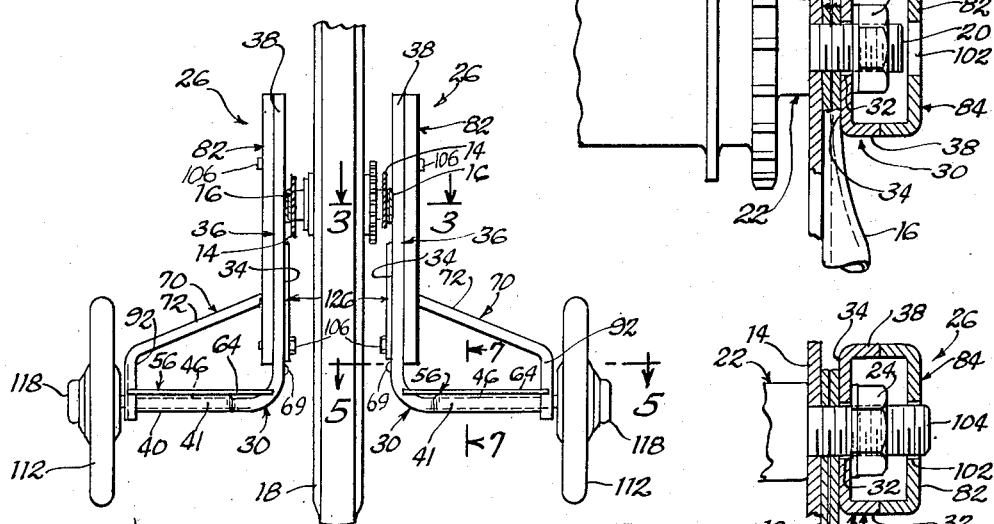
Fig. 2 is a rear elevational view taken as indicated by the line 2—2 in Fig. 1.
Figure 3:
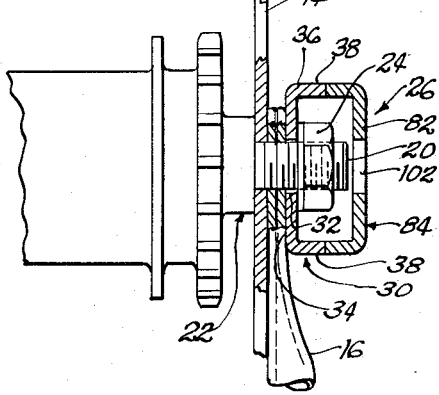
Fig. 3 is an enlarged view, partly in section and partly in elevation, taken as indicated by the line 3—3 in Fig. 2.

Referring now more particularly to the drawings, disclosing illustrative embodiments of the invention, there is shown a bicycle 10 having a frame 12 with rear side arms 14 and fender braces 16 straddling the rear wheel 18 and through which pass the threaded ends 20 of the rear axle 22. The axle end nuts 24 normally holding the arms 14 and braces 16 in assembly with the axle 22 are removed to enable the structure of my invention to be mounted on a bicycle, and are reapplied to elements of said structure for that purpose, as will appear.

The device of my invention involves two preferably identical units or assemblies 26 arranged at opposite sides of the rear wheel 18 of the bicycle. Each unit 26 comprises an L-shaped channel bracket 30 having alined vertical slots 32 in the web 34 of its vertical arm 36 for selective reception of an end 20 of the axle 22, the slots being substantially spaced from the flanges 38 so that a nut 24 may be applied to the axle end and be accommodated between the flanges adjacent the inner surface of the web.

The bracket 30 has a horizontal arm 40 which is upset so as to afford an outboard portion 41 substantially narrower, as shown in Figs. 5 and 7, than the vertical arm 36, thus affording substantially wider flanges 42 whose margins 44 extend toward each other. An outboard axle 46 is securely held by the horizontal arm 40 of the bracket 30. The axle 46 is preferably formed of round steel stock, an intermediate portion 48 of which is flattened, providing mutually facing shoulders at the ends of the flattened portion, and tightly engaged above and below by the marginal lips 44 and web 50 of the horizontal arm portion 41, so that the axle is immovably locked to the arm.

Each unit 26 may include a step plate 56, preferably formed of sheet steel, to accommodate an extra rider. The plate 56 comprises a depending tongue 58 at its outer end, said tongue having a hole 60 enabling the tongue to be telescoped about the round outer end portion 62 of the outboard axle 46 substantially to the outer end of the horizontal arm 40. The plate 56 has a flat horizontal intermediate tread portion 64 overlying the arm 40 and formed at its inner end with notches 66 in which the flange corner portions 67 of the bracket 30 are received. A tongue 68 extends between and beyond the notches 66 and is offset upward and riveted as at 69 or otherwise suitably secured to the web 34 of the vertical arm 36.

An obtusely angular channel bar brace 70 forms a part of each unit 26, and comprises a relatively long arm 72 inclined to the bracket arms 36 and 40, the brace web 74 extending beyond the brace flanges 76 to provide a tongue 78 which initially is projected through a transverse slot 80 in the web 82 of a channel bar 84 (hereinafter more fully described) and is thereafter bent and clinched as shown against the inner face of the bar web, with the adjacent upper ends 88 of the brace flanges engaged with the outer face of the bar. The other brace arm 92 has a web hole 94 to enable the same to be telescoped about the outboard axle end portion 62, and the outer end of the tread portion 64 is formed with notches 96 at the sides of the upper end of the plate tongue 58 for the reception of the brace flanges 76.

Figure 4:
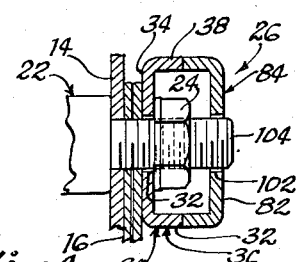
Fig. 4 is a view similar to Fig. 3 but shows the relation of certain of the parts where the projecting ends of the rear axle are longer than shown in Fig. 3.

When the brace flanges 76 are disposed in the plate notches 96, the flanges 100 of the reinforcing channel bar 84 are in edgewise engagement with the bracket arm flanges 38, the slots 32 in the arm web 34 are in register with slots 102 in the web 82 of said bar, the latter slots being provided to afford clearance for the associated rear axle end 104 in the event such end projects outward beyond the inner face 86 of the bar web (Fig. 4), and the holes formed in the respective webs for the reception of fastening screws 106 are in register, one such hole 108 in each such web being tapped.

An outboard balancing wheel 112 is slipped onto the outboard axle end 62, followed by a washer 114, a cotter pin 116 is applied, and a hub cap 118 is fastened as by screws 120 to the outer side of said wheel and encloses the free end of the axle 46.

The vertical bracket arm 36 has a horizontal slot 124 which registers with the horizontal slot 80 in the reinforcing bar 84, but has no function, and is there present only because the same die is employed in stamping various slots and holes in the webs of the said arm and reinforcing bar, thus saving the expense which an additional die would entail.

If it is desired to provide a bicycle balancer without provision for an extra passenger, the step plate 84 may be omitted.

For stabilizing the bracket 30 and associated parts, I provide a strut 126 having a longitudinal lower end slot 128 through which the lower screw 106 passes, and an upper end hole 130, and a strap 132 readily bent by hand into the shape of a U and slipped over a rear side arm 14 of the bicycle frame with the strap legs 134 and 136 extending downward, the outer leg 136 having a hole 138 adjacent the end thereof and the inner leg 134 having preferably a plurality of vertically spaced holes 140, the strap being bendable to place any one of the holes 140 in register with the hole 138, the upper end of the strut being connected to the strap, and the strap and strut securely clamped to the frame arm at the desired location by means of a bolt 142 and associated nut 144.

The strap 132 is accordingly adjustable to fit rear side frame arms of different cross sections and may be adjusted along such arms to accommodate the upper end of the strut 126, which, by virtue of its slot 128, is adjustably connectable to the bracket 30. Moreover, the slots 32 in the vertical arm 36 of each bracket 30 enable the brackets to be secured to the axles of rear wheels of different diameters and to be secured at different heights relative to any one such axle, to locate the balancing wheels 112 at the desired level.

The bracket 30, brace 70, and reinforcing bar 84 may be formed of the same channel steel stock, the horizontal arm 40 of the bracket being upset to the form shown. To mount the unit 26 on a rear axle, it is necessary merely to remove the nut associated with each axle end, slip the vertical arm of each bracket 30 over the axle end with said end projecting through a selected vertical slot in said arm, connect the upper end of the stabilizing strut by means of the bendable strap and threaded means associated therewith to an appropriate forward part of the frame rear side arm, adjust the bracket to the desired height, tighten the nut on the portion of the axle end projecting in the arm of the bracket, with said arm extending vertically, secure the lower end of the stabilizing strut to said arm, slip the lower end of the brace on the outboard axle, attach the reinforcing bar to said arm, and mount the balancing wheel on the outboard axle.

The brace 70 and reinforcing bar 84 may be formed as a single channel bar as shown in Fig. 9, and in such event the inner arm 152 of the bar preferably has a lower tapped hole 154 and the adjacent arm 36 of the bracket 30 would be formed with a registering hole 156 to receive the lower screw 106.

Various modifications may suggest themselves to those skilled in the art without departing from the spirit of my invention. Hence I do not wish to be restricted to the specific forms shown or uses mentioned, except to the extent indicated in the appended claims, which are to be interpreted as broadly as the state of the art will permit.

I claim:

1. In a bicycle balancer, a unit adapted to be mounted at each side of the rear wheel of a bicycle, said unit comprising an L-shaped bracket having one arm adapted to be placed vertically adjacent the rear wheel to receive a protruding rear axle threaded end from which the usual assembling nut has been removed, said arm having alined longitudinal slots for the selective reception of the axle end whereby the nut may be engaged with the axle end to secure said arm to the axle, a reinforcing member having an upper end portion secured to said arm and having slots registering with the aforesaid slots, said bracket arm and said reinforcing member being so shaped as to form conjointly a tubular structure, an outboard axle secured to and extending beyond the free end of the other arm of said bracket and away from the one arm, a step plate having a tread positioned over and extending along the upper side of the other arm, said plate having at its inner end a tongue secured to said one arm and having at its outer end a tongue through which said outboard axle passes, said reinforcing member having an intermediate portion overlying said tread and inclined to said arms and having a lower end portion through which said outboard axle projects, said plate having notches at the sides of said outer tongue for the reception of said lower end portion, a bicycle balancing wheel mounted on said outboard axle, a strut adjustably connected at one end to said one arm adjacent said other arm, and means for attaching the other end of said strut to a side of the bicycle frame.

2. In a bicycle balancer, a balancing unit comprising an L-shaped bracket, one of whose arms has a longitudinal slot for the adjustable reception of a threaded end of the rear axle of a bicycle when the usual axle end nut is removed so that the nut may be reengaged with the axle end to connect said arm to the axle, a strut connected to said arm substantially below the slot thereof and connectible to a portion of the vehicle frame extending forward from the rear of the bicycle for cooperating with the rear wheel axle in supporting said arm in vertical position, the other arm of said bracket extending outwardly away from the rear wheel when the first arm is connected to the axle, an outboard axle secured to and projecting beyond the second arm for the reception of a balancing wheel, a step plate having a tread disposed over said second arm, said step plate having an inner end secured to said first arm and having an outer end through which said outboard axle passes, and an angular reinforcing member having a channel-shaped upper portion secured to the first arm with a web slot in register with the aforesaid slot and with its flanges in edgewise engagement with said arm, said member having an intermediate portion overlying said tread and a lower portion disposed adjacent and outward beyond the outer end of said plate, said outboard axle passing through said lower end portion.

3. In a bicycle having a rear wheel and axle therefor and frame members extending forward from the ends of the axle at the sides of the wheel, a bicycle balancer comprising a pair of identical units, each unit comprising an L-shaped bracket having an upper vertical arm and a lower horizontal arm, said vertical arm having vertically alined slots for the selective reception of a threaded end of the axle, a strut for bracing said vertical arm relative to one side of the side frame members, means adjustable along the side frame member for clamping the upper end of said strut thereto, the lower end of said strut having a longitudinal slot, a fastening member extending through said strut slot for adjustably connecting said strut to said vertical arm substantially below the lowest slot in said vertical arm, a reinforcing channel connected to and arranged outwardly of said vertical arm, with the flanges of said channel in edgewise engagement with said arm, said channel having slots in register with the slots in said arm, an outboard axle secured to and extending outward beyond said horizontal arm, and a brace connected to said reinforcing channel and having a hole through which said outboard axle passes.

4. In a bicycle balancer, a unit adapted to be mounted at each side of the rear wheel of a bicycle whose rear axle has threaded ends with removable mounting nuts, said unit comprising an L-shaped bracket including a channel-shaped vertical arm whose web has an opening for the reception of one of the axle ends when the associated nut is removed, the inner face of said web being adjacent the nut when the nut is reapplied to such axle end for mounting said arm on such axle end, a reinforcing channel bar identical with, and secured to, a substantial portion of said arm with the flanges of said reinforcing bar in edgewise engagement with the respective flanges of said portion, the web of said reinforcing bar having an opening in register with the opening in the web of said arm to afford clearance for such axle end, said bracket having a substantially tubular horizontal arm extending laterally from the lower end of said vertical arm substantially normal to the rear wheel when said vertical arm is mounted as aforesaid, a step plate having a horizontal tread over said horizontal arm, the inner end of said plate being secured to said vertical arm, the outer end of said plate being offset downward adjacent and confronting the outer end of said horizontal arm, a brace having an upper end secured to said reinforcing bar and a lower outer end outside of and adjacent said outer end of said plate, said outer ends of said plate and brace having registering holes substantially coaxial with said horizontal arm, and an outboard axle locked in said horizontal arm and projecting therefrom through said registering holes for supporting said outer ends of said plate and brace bar and therebeyond for the reception of an outboard bicycle-balancing wheel.

5. In a bicycle balancer, a unit adapted to be mounted at each side of the rear wheel of a bicycle whose rear axle has threaded ends with removable mounting nuts, said unit comprising an L-shaped steel bracket having an opening in one arm for the reception of an axle end, said opening being spaced from the sides of said arm so that one of the mounting nuts may be accommodated between the same to secure said bracket to the axle, a portion of said arm being straight, a reinforcing bar secured to a substantial portion of said arm and having an opening, the respective openings being in register and the bracket arm and reinforcing bar being in mutual engagement and being so shaped as to form conjointly a tubular structure, a stub axle locked in and projecting beyond the free end of the other arm of said bracket, and a channel brace, one end of said brace having a hole through which the projecting portion of said stub axle passes, said reinforcing bar having a slot substantially spaced from said other arm, said brace having at its other end a tongue passing through said slot and clinched against the inner surface of said reinforcing bar.

6. In a bicycle balancer, a unit adapted to be mounted at each side of the rear wheel of a bicycle whose rear axle has threaded ends with removable mounting nuts, said unit comprising an L-shaped steel channel bracket having an opening in the web of one arm for the reception of an axle end, said opening being spaced from the flanges of said arm so that a nut threaded on the axle end may be accommodated between said flanges to secure said bracket to the axle, a reinforcing steel channel bar having a web opening and secured to said arm with the respective openings in register and with the respective longitudinal flange edges in mutual engagement, a channel brace connected to said reinforcing bar, a step plate adjacent and substantially coextensive in length with the other arm and substantially engaging the faces of the flanges of said one arm and of said brace, a stub axle locked in and projecting beyond the free end of said other arm of said bracket and passing through the outer end portions of said brace and plate.

7. In a bicycle balancer, an L-shaped bracket having an arm adapted in use to extend vertically at a side of the rear wheel of the bicycle, said arm having a longitudinal slot for receiving a threaded end of the rear axle from which the usual nut has been removed, whereby the nut may be reengaged with the axle end to secure said arm in adjusted relation to the axle, the other arm of said bracket extending in use horizontally from the bottom of the vertical arm substantially normal to the rear wheel, the horizontal arm being channel-shaped, and an outboard axle having an elongated portion disposed on the web of said horizontal arm, said portion having an upper flat surface and mutually facing shoulders at the ends of said surface, the flanges of said horizontal arm adjacent said web engaging and straddling said portion and having marginal lips extending toward each other and engaging said surface, the sides of said lips engaging said shoulders whereby said outboard axle is securely locked to said horizontal arm, and means for bracing said arms, said means having a lower end embracing said outboard axle remote from said vertical arm and an upper end connected to said vertical arm remote from said horizontal arm.

8. In a bicycle balancer, a unit adapted to be mounted on each threaded end of the rear axle of a bicycle by the nut associated with such end after the nut has been removed, said unit comprising a steel arm having a web and a reinforcing flange and adapted to extend vertically and having longitudinal slots in its web for the selective reception of one of the threaded ends of the rear axle whereby the nut may be applied to the axle end between the arm flanges to secure said bracket at different elevations to the axles of rear wheels of different diameters, an outboard axle adapted to carry a bicycle balancing wheel, means rigidly connecting said outboard axle to the lower end of said arm, and a steel reinforcing bar connected to said arm and having a web and reinforcing flange arranged opposite said arm to form a tubular structure, said reinforcing bar having web slots in register with the aforesaid web slots to afford clearance for the axle end.

9. In a bicycle balancer, a unit adapted to be mounted on each threaded end of the rear axle of a bicycle by the nut associated with such end after the nut has been removed, said unit comprising a steel arm adapted to extend vertically and having longitudinal slots in its web for the selective reception of one of the threaded ends of the rear axle whereby the nut may be applied to the axle end to secure said bracket at different elevations to the axles of rear wheels of different diameters, an outboard axle adapted to carry a bicycle balancing wheel, means rigidly connecting said outboard axle to the lower end of said arm, a steel reinforcing bar connected to said arm, and said arm and bar having cooperating flange means forming a tubular structure, and a steel bar brace connected at one end to said outboard axle remote from said arm, and at its other end to said reinforcing bar remote from said outboard axle.

10. In a bicycle balancer, a unit adapted to be mounted on each threaded end of the rear axle of a bicycle by the nut associated with such end after the nut has been removed, said unit comprising a channel-shaped steel arm adapted to extend vertically and having longitudinal slots in its web for the selective reception of one of the threaded ends of the rear axle whereby the nut may be applied to the axle end between the arm flanges to secure said bracket at different elevations to the axles of rear wheels of different diameters, an outboard axle adapted to carry a bicycle balancing wheel, means rigidly connecting said outboard axle to the lower end of said arm, a channel-shaped steel reinforcing bar connected to said arm and arranged with its flanges in edgewise engagement with the flanges of said arm, and a channel-shaped bar brace connected at one end to said outboard axle remote from said arm and at its other end to said reinforcing bar remote from said outboard axle, the ends of the flanges of said brace abutting the web of said reinforcing bar.

References Cited in the file of this patent

UNITED STATES PATENTS

| | | |
|---|---|---|
| 382,211 | Blevens | May 1, 1888 |
| 1,846,567 | Murray | Sept. 28, 1926 |
| 2,541,952 | Williams | Feb. 13, 1951 |
| 2,601,994 | Richman | July 1, 1952 |
| 2,612,388 | McNeill et al. | Sept. 30, 1952 |
| 2,647,764 | Anderson | Aug. 4, 1953 |

FOREIGN PATENTS

| | | |
|---|---|---|
| 585,036 | France | Dec. 2, 1924 |
| 689,864 | France | June 3, 1930 |
| 156,487 | Germany | July 10, 1939 |